US012734852B2

(12) United States Patent
Johnson et al.

(10) Patent No.: US 12,734,852 B2
(45) Date of Patent: Sep. 15, 2026

(54) AUTOMATED TRAILER COUPLING ARRANGEMENT

(71) Applicant: SAF-Holland, Inc., Muskegon, MI (US)

(72) Inventors: Marc R. Johnson, Spring Lake, MI (US); Larry D. Hewitt, II, Whitehall, MI (US); Justin D. Keatley, Zeeland, MI (US)

(73) Assignee: SAF-Holland, Inc., Muskegon, MI (US)

( * ) Notice: Subject to any disclaimer, the term of this patent is extended or adjusted under 35 U.S.C. 154(b) by 352 days.

(21) Appl. No.: 18/530,939

(22) Filed: Dec. 6, 2023

(65) Prior Publication Data

US 2024/0131883 A1 Apr. 25, 2024

Related U.S. Application Data

(63) Continuation-in-part of application No. 18/149,370, filed on Jan. 3, 2023, now Pat. No. 11,981,171, which (Continued)

(51) Int. Cl.
*B60D 1/36* (2006.01)
*B60D 1/01* (2006.01)
(Continued)

(52) U.S. Cl.
CPC ................. *B60D 1/36* (2013.01); *B60D 1/01* (2013.01); *B60D 1/363* (2013.01); *B60D 1/42* (2013.01); *B60D 1/62* (2013.01)

(58) Field of Classification Search
CPC . B60D 1/36; B60D 1/01; B60D 1/363; B60D 1/42; B60D 1/62
See application file for complete search history.

(56) References Cited

U.S. PATENT DOCUMENTS 3,888,513 A 6/1975 Pilz
4,111,452 A 9/1978 Carlsson
(Continued)

FOREIGN PATENT DOCUMENTS

DE 202005005676 U1 8/2005
EP 2431201 A1 3/2012
(Continued)

OTHER PUBLICATIONS

The Hague, Extended European Search Report, Jan. 22, 2020.
The Hague, Extended European Search Report, Mar. 30, 2022; entire document.

*Primary Examiner* — Jacob D Knutson
(74) *Attorney, Agent, or Firm* — Price Heneveld LLP

(57) ABSTRACT

An automated trailer coupling arrangement includes a downwardly opening receiver member supported in a bottom surface of a towed vehicle at a first vertical height and including pneumatic/electrical couplers, a shuttle member including pneumatic/electrical couplers to couple to pneumatic and electrical supply sources and an arm pivotably coupled to a towing vehicle at a second vertical height that is less than the first vertical height and including a carrier member to operably couple/uncouple with the shuttle member, and an actuator coupled to the carrier member to move the carrier between a first position where the carrier member is coupled with the shuttle member and the shuttle member is spaced from the receiver member, and a second position where the pneumatic couplers and electrical couplers are respectively coupled with one another and the carrier is uncoupled and spaced from the shuttle member.

17 Claims, 12 Drawing Sheets

Related U.S. Application Data is a continuation of application No. 16/549,607, filed on Aug. 23, 2019, now Pat. No. 11,618,289.

(60) Provisional application No. 62/731,483, filed on Sep. 14, 2018.

(51) Int. Cl.

| | |
|---|---|
| ***B60D 1/42*** | (2006.01) |
| ***B60D 1/62*** | (2006.01) |

(56) References Cited

U.S. PATENT DOCUMENTS

| | | | | |
|---|---|---|---|---|
| 5,346,239 | A * | 9/1994 | Wohlhuter | B62D 53/125 280/422 |
| 5,607,221 | A | 3/1997 | Justus | |
| 6,179,319 | B1 * | 1/2001 | Malisch | B62D 53/125 280/477 |
| 7,758,059 | B2 | 7/2010 | Gallego et al. | |
| 7,854,443 | B2 | 12/2010 | Alguera | |
| 2011/0037241 | A1 * | 2/2011 | Temple | B60D 1/64 280/421 |

FOREIGN PATENT DOCUMENTS

| | | | | |
|---|---|---|---|---|
| GB | 2467955 | A * | 8/2010 | B60D 1/64 |
| JP | 2009035052 | A | 2/2009 | |
| WO | 9111338 | | 8/1991 | |
| WO | 2008038313 | A1 | 4/2008 | |
| WO | 2010118420 | A2 | 10/2010 | |
| WO | 2017171911 | A1 | 10/2017 | |
| WO | 2019165150 | A1 | 8/2019 | |

* cited by examiner 26
16
24
162
184
182
12
28
48
50
73
22
104
30
102

162
16
182
12
28
26
24
48
50
22
104
73
30
102

28
26
144
148
140
142
24
188
169
138
192
114

AUTOMATED TRAILER COUPLING ARRANGEMENT

CROSS-REFERENCE TO RELATED APPLICATIONS

This application claims priority to and is a continuation-in-part application of U.S. patent application Ser. No. 18/149,370, filed Jan. 3, 2023, entitled "AUTOMATED TRAILER COUPLING ARRANGEMENT," now U.S. Pat. No. 11,981,171, which is a continuation of U.S. patent application Ser. No. 16/549,607, filed Aug. 23, 2019, entitled "AUTOMATED TRAILER COUPLING ARRANGEMENT," now U.S. Pat. No. 11,618,289, which claims the benefit of U.S. Provisional Patent Application No. 62/731,483, filed Sep. 14, 2018, entitled "AUTOMATED TRAILER COUPLING ARRANGEMENT," the entire disclosures of which are incorporated herein by reference.

BACKGROUND

The embodiments disclosed herein relate to an arrangement for connecting a towed vehicle to a towing vehicle, and in particular to an automated connection arrangement for connecting a semi-truck or tractor-trailer to an associated heavy-duty semi-trailer.

BRIEF SUMMARY

One embodiment as disclosed herein includes an automated trailer coupling arrangement that includes a downwardly opening receiver member supported within a downwardly facing surface of a towed vehicle and including a first pneumatic coupler and an electrical coupler, wherein the receiver member is located at a first vertical height, a shuttle member including a second pneumatic coupler configured to couple to a pneumatic supply source of a towing vehicle, and a second electrical coupler configured to couple to an electrical supply source of the towing vehicle; and a control arm assembly supported on a towing vehicle. The control arm includes a carrier member configured to operably couple and uncouple with the shuttle member, an arm having a first end operably coupled to the towing vehicle at a second vertical height that is less than the first vertical height, and a second end coupled to the carrier member and configured to move the carrier between a first position where the carrier member is coupled with the shuttle member and the shuttle member is spaced from the receiver member, and a second position where the second pneumatic coupler is coupled with the first pneumatic coupler and the second electrical coupler is coupled with the first electrical coupler and the carrier is uncoupled and spaced from the shuttle member.

Another embodiment as disclosed herein may alternatively or in addition include an automated trailer coupling arrangement that includes a downwardly opening receiver member configured to be supported on or within a downwardly facing surface of a towed vehicle and including a first pneumatic coupler and an electrical coupler, wherein the receiver member is located at a first vertical height, a shuttle member including a second pneumatic coupler configured to couple to a pneumatic supply source of a towing vehicle, and a second electrical coupler configured to couple to an electrical supply source of the towing vehicle, and a control arm assembly configured to be supported on a towing vehicle. The control arm assembly includes a carrier member configured to operably couple and uncouple with the shuttle member, an arm having a first end operably coupled to the towing vehicle at a second vertical height that is less than the first vertical height for pivoting about a horizontal axis perpendicular to a longitudinal axis of the towing vehicle, and a second end coupled to the carrier member and configured to move the carrier between a first position where the carrier member is coupled with the shuttle member and the shuttle member is spaced from the receiver member, and a second position where the second pneumatic coupler is coupled with the first pneumatic coupler and the second electrical coupler is coupled with the first electrical coupler and the carrier is uncoupled and spaced from the shuttle member, wherein a distance between the first end and the second end is fixed as the arm moves between the first and second positions, wherein a vertical distance between the second vertical height and the first vertical height is equal to about 12 inches, and wherein an angle between a longitudinal axis of the arm in the first position and the second position is greater than or equal to about 30°.

Yet another embodiment as disclosed herein may in addition or alternatively include a method for operating an automated trailer coupling arrangement that includes providing a downwardly opening receiver member supported on or within a downwardly facing surface of a towed vehicle and including a first pneumatic coupler and an electrical coupler, wherein the receiver member is located at a first vertical height, providing a shuttle member including a second pneumatic coupler pneumatically coupled to a pneumatic supply source of a towing vehicle, and a second electrical coupler coupled to an electrical supply source of the towing vehicle, providing a control arm assembly coupled to a towing vehicle that includes a carrier member configured to operably couple and uncouple with the shuttle member, and an arm having a first end operably coupled to the towing vehicle at a second height that is less than the first height, and a second end coupled to the carrier member. The method may further include coupling the shuttle member to the receiver by moving the control arm assembly from a first position where the carrier member is coupled with the shuttle member and the shuttle member is spaced from the receiver member, to a second position where the shuttle member is received within the receiver member and is coupled to the carrier member, to a third position where the shuttle member is received within the receiver member and the first pneumatic coupler is pneumatically coupled with the second pneumatic coupler, respectively, and the first electrical coupler is coupled with the second electrical coupler, to a fourth position where the carrier member is uncoupled from the shuttle member and abuts the shuttle member, to a fifth position wherein the carrier member is uncoupled and spaced from the shuttle member.

The embodiments as disclosed herein provide an automated trailer coupling arrangement of a robust and durable design that greatly increases the efficiency of truck/trailer operators while simultaneously improving safety relating to the coupling/uncoupling of a trailer to/from a towing vehicle. The automated trailer coupling arrangement may be utilized with manned or autonomous vehicle applications, may be retrofitted to existing vehicle platforms, is capable of a long operating life, and is particularly well adapted for the proposed use.

These and other features, advantages, and objects of the embodiments disclosed herein will be further understood and appreciated by those skilled in the art by reference to the following specification, claims, and appended drawings.

DETAILED DESCRIPTION OF THE PREFERRED EMBODIMENTS

Figure 1:
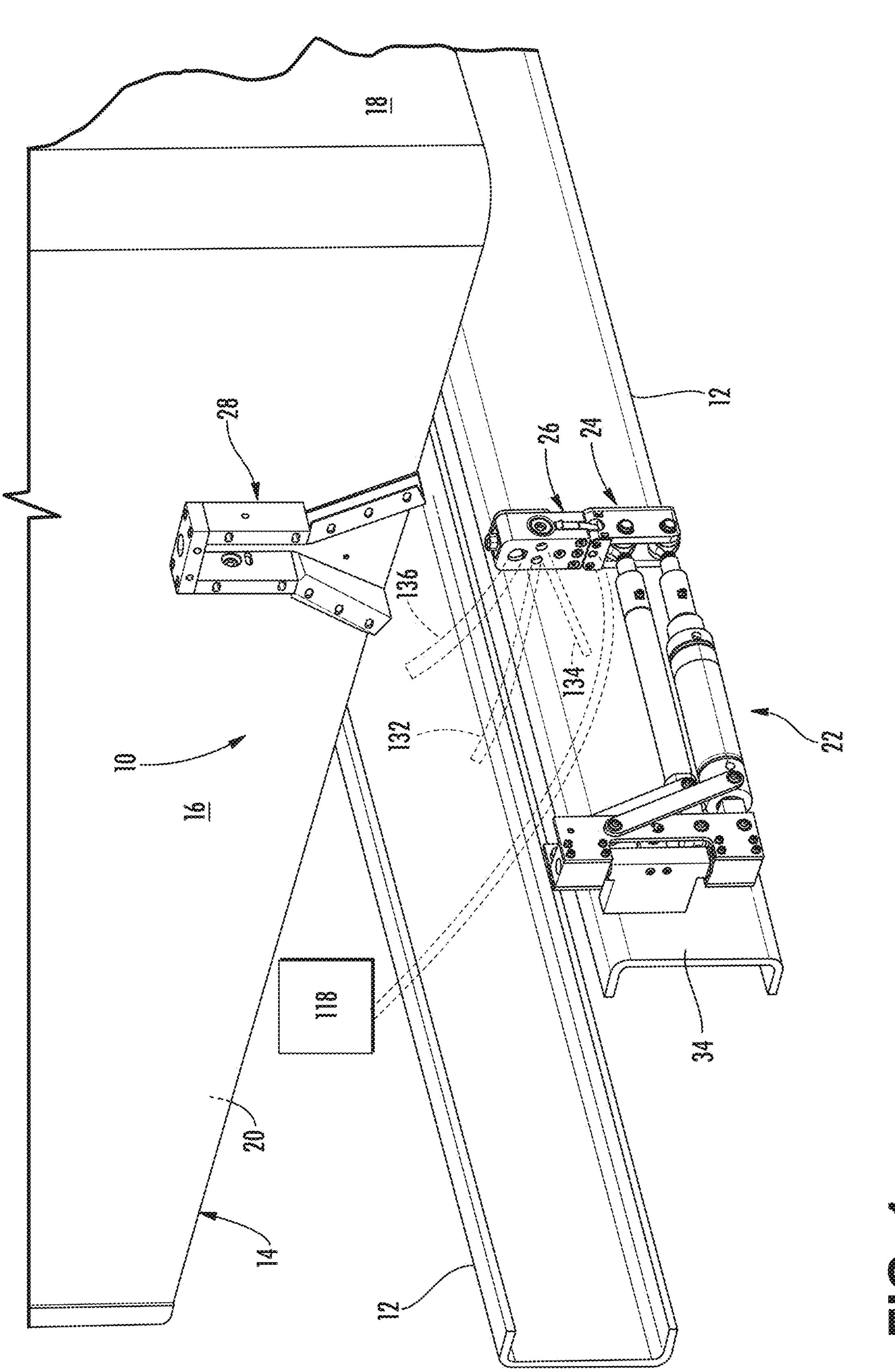
FIG. 1 is a perspective view of an embodiment of an automated trailer coupling arrangement.

For purposes of description herein, the terms “upper,” “lower,” “right,” “left,” “rear,” “front,” “vertical,” “horizontal,” and derivatives thereof shall relate to the invention as oriented in FIG. 1. However, it is to be understood that the embodiments as disclosed herein may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other characteristics relating to the embodiments disclosed herein are not to be considered as limiting, unless the claims expressly state otherwise.

The reference numeral 10 (FIG. 1) generally designates an automated coupling or connection arrangement for pneumatically and electrically coupling a towing vehicle, or semi-truck to a towed vehicle, or semi-trailer. In the illustrated example, the towing vehicle includes a pair of longitudinally-extending, C-shaped frame rails 12 while the towed vehicle includes a cargo housing or container 14 having at least a front wall 16, a pair of side walls 18, and a bottom wall 20. The embodiments of the automated connection arrangement 10 may also be utilized with vehicles having other configurations including commercial and light-duty vehicles.

Figure 2:
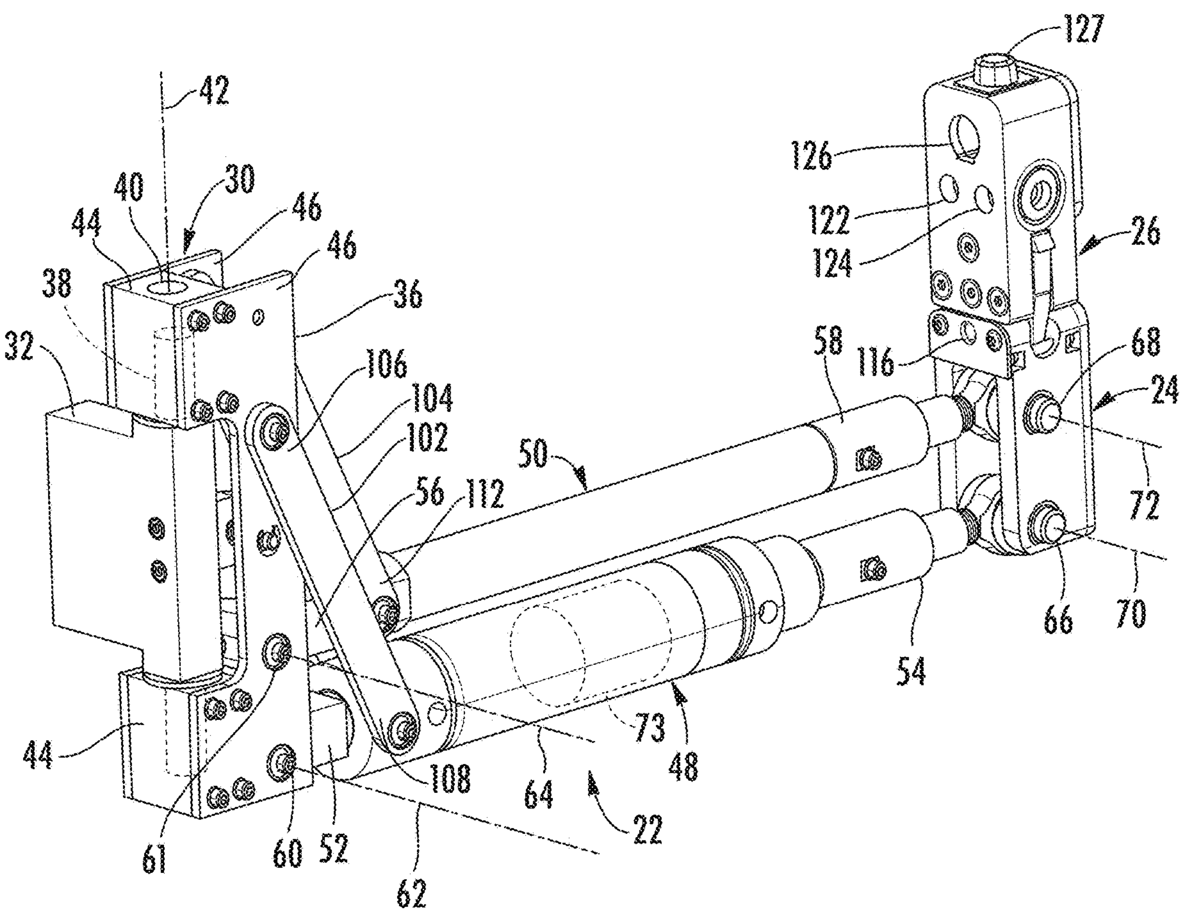
FIG. 2 is a front perspective view of the automated trailer coupling arrangement.
Figure 3:
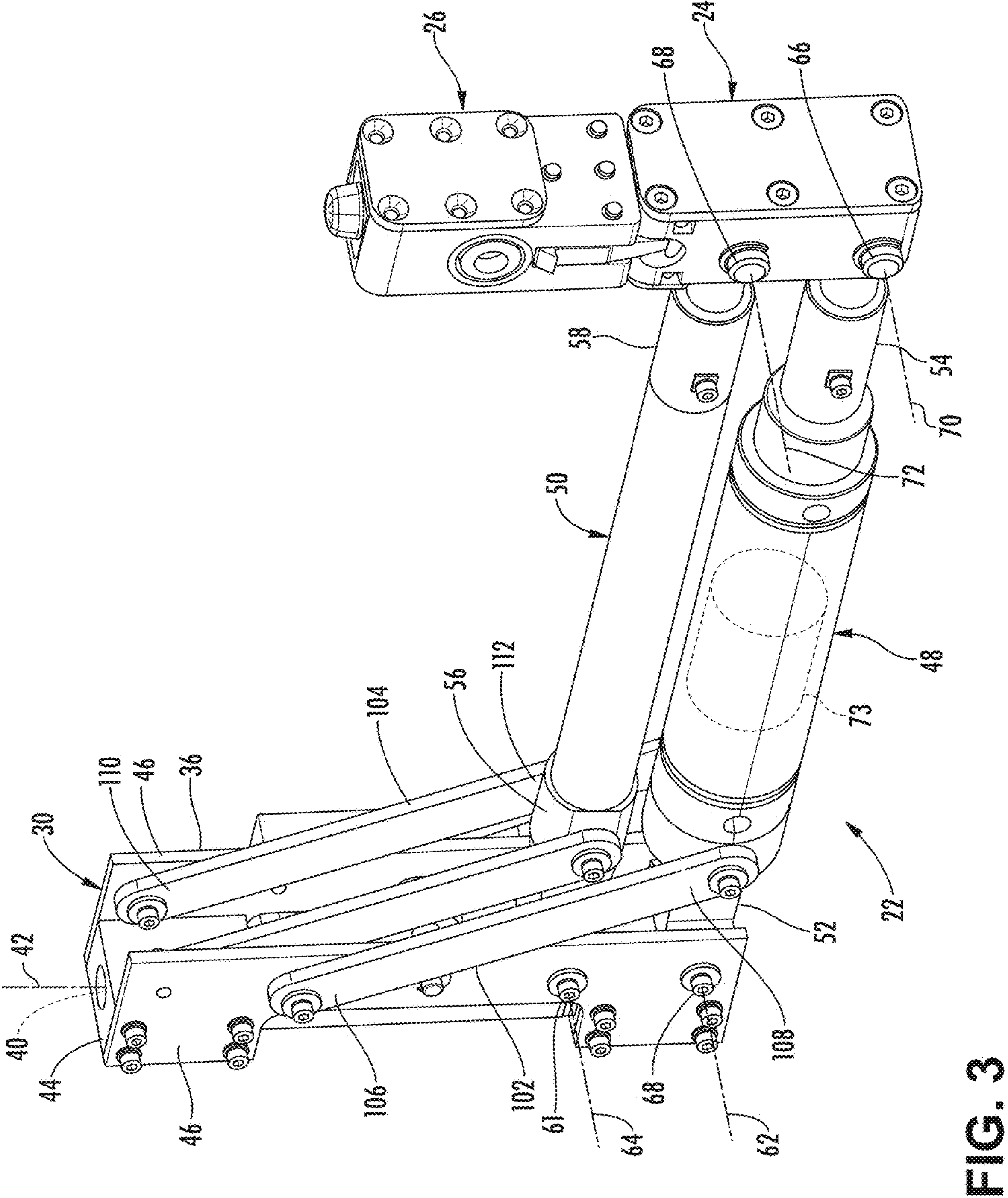
FIG. 3 is a rear perspective view of the automated trailer coupling arrangement.

In the illustrated example, the connection arrangement 10 includes an automated placer assembly 22 (FIGS. 1-3), and a carrier 24 and a shuttle 26 configured to be manipulated and placed by the placer arrangement 22, and a receiver 28 fixedly secured to the front wall 16 of the cargo housing 14 of the trailer and configured to receive and couple with the shuttle 26.

The placer assembly 22 includes a mounting assembly 30 including a mounting member 32 configured to be secured to a vertical portion 34 (FIG. 1) of one of the frame rails 12, and a C-shaped mounting bracket 36 pivotably coupled to the mounting member 32 via a pair of pivot pins 38 of the mounting member 32 received within a pair of corresponding bores 40 of the mounting bracket 36 and pivotable about an axis 42. The mounting bracket 36 comprises a pair of pivot blocks 44 and a pair of side plates 46 that cooperates to provide a C-shaped cross-sectional configuration. The placer assembly 22 further includes a cylinder assembly 48 and an upper arm 50, where the cylinder assembly 48 includes a first end 52 and a second end 54 and the upper arm includes a first end 56 and a second end 58. The first end 52 of the cylinder assembly 48 and the first end 56 of the upper arm 50 are attached to the side plates 46 of the mounting bracket 36 by a pair of mechanical fasteners, such as bolts 60, 61 for pivoting about pivot axes 62, 64, respectively. The second end 54 of the cylinder assembly 48 and the second end 58 of the upper arm 50 are operably coupled to carrier 24 via a pair of pivot pins 66, 68 for pivoting about a pair of pivot axes 70, 72, respectively, where the carrier 24 is described in more detail below. In the illustrated example, the cylinder assembly 48 is driven by an internal pneumatic cylinder arrangement 73.

Figure 4:
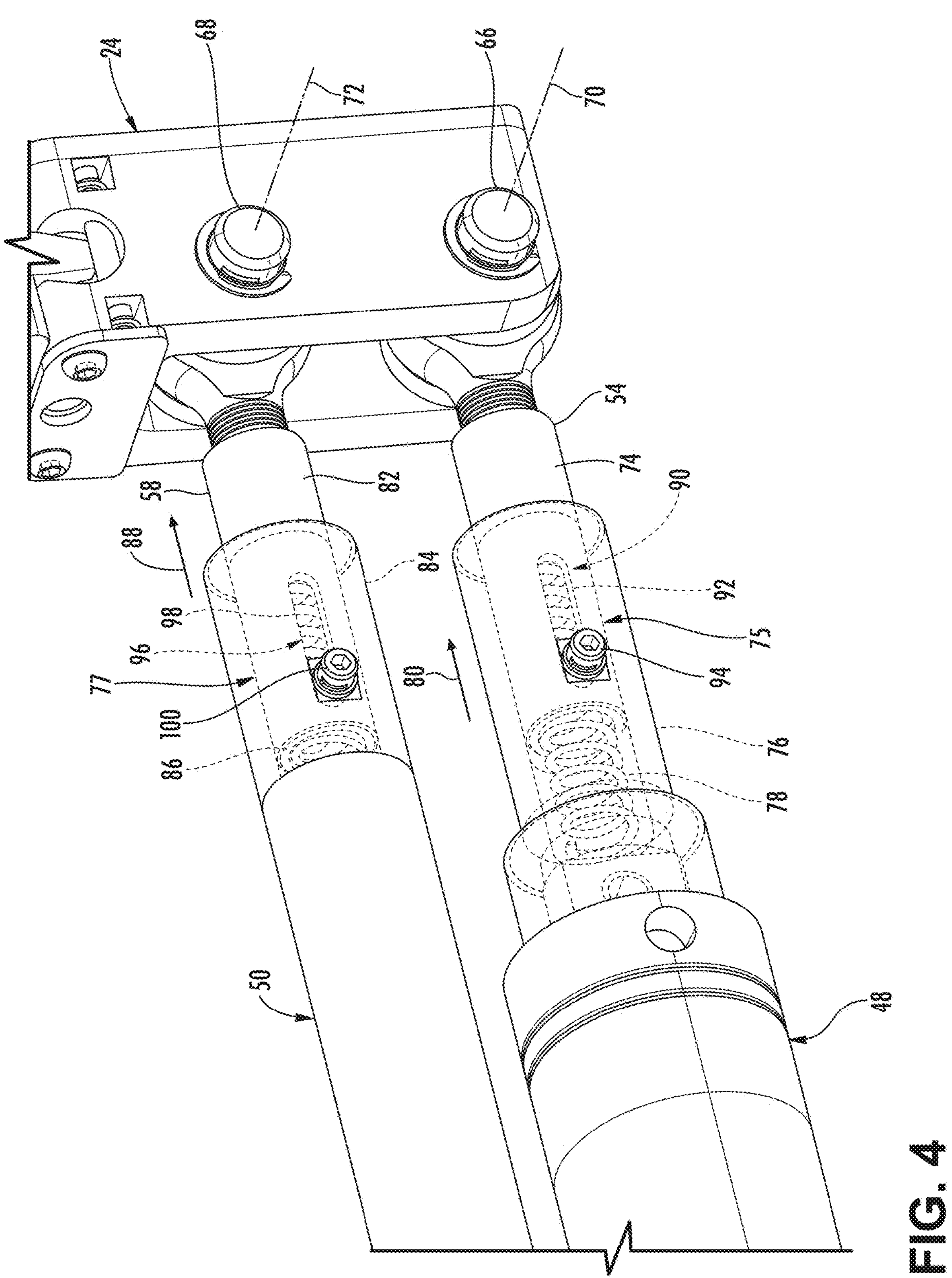
FIG. 4 is an enlarged perspective view of an area of the automated trailer coupling arrangement with portion of cylinder arrangements shown in phantom to illustrate internal components thereof.

As best illustrated in FIG. 4, the second end 54 of the cylinder assembly 48 and the second end 58 of the upper arm 50 each include spring-biased, length-adjustment arrangements 75, 77. Specifically, the length-adjustment arrangement 75 of the cylinder assembly 48 includes an inner housing 74 telescopingly received within an outer housing 76, and a spring member 78, such as a coil spring, positioned between the inner housing 74 and the outer housing 76 and biasing the inner housing 74 from the outer housing 76 in a direction 80, while the length-adjustment arrangement 77 of the upper arm 50 includes an inner housing 82 telescopingly received within an outer housing 84 and a spring member 86, such as a coil spring, positioned between the inner housing 82 and the outer housing 84 and biasing the inner housing 82 from the outer housing 84 in a direction 88. Total travel of the inner housing 74 within the outer housing 76 is limited by a travel limiter 90 that includes a slot 92 extending through the inner housing 74 and a screw 94 that extends through the slot 92 and is threadably received within the outer housing 76, while travel of the inner housing 82 within the outer housing 84 is limited by a travel limiter 96 that includes a slot 98 extending through the inner housing 82, and a screw 100 that extends through the slot 98 and is threadably received within the outer housing 84. Travel of the inner housing 74 is limited with respect to the outer housing 76 by the screw 94 contacting the ends of the slot 92, while travel of the inner housing 82 with respect to the outer housing 84 is limited by the screw 100 contacting the ends of the slot 98.

In the illustrated example, the cylinder assembly 48, the upper arm 50, the mounting bracket 36 and the carrier 24 cooperate to form a four-bar linkage arrangement. The placer assembly 22 further includes a pair of lower control linkages 102 each having a first end 106 pivotably coupled to an associated side plate 46 of the mounting bracket 36 and a second end 108 pivotably coupled to the cylinder assembly 48 along the length thereof, and a pair of upper control linkages 104 each having a first end 110 pivotably coupled to an associated side plate 46 of the mounting bracket 36, and a second end 112 pivotably coupled to the upper arm 50 along the length thereof.

Figures 5A, 5B:
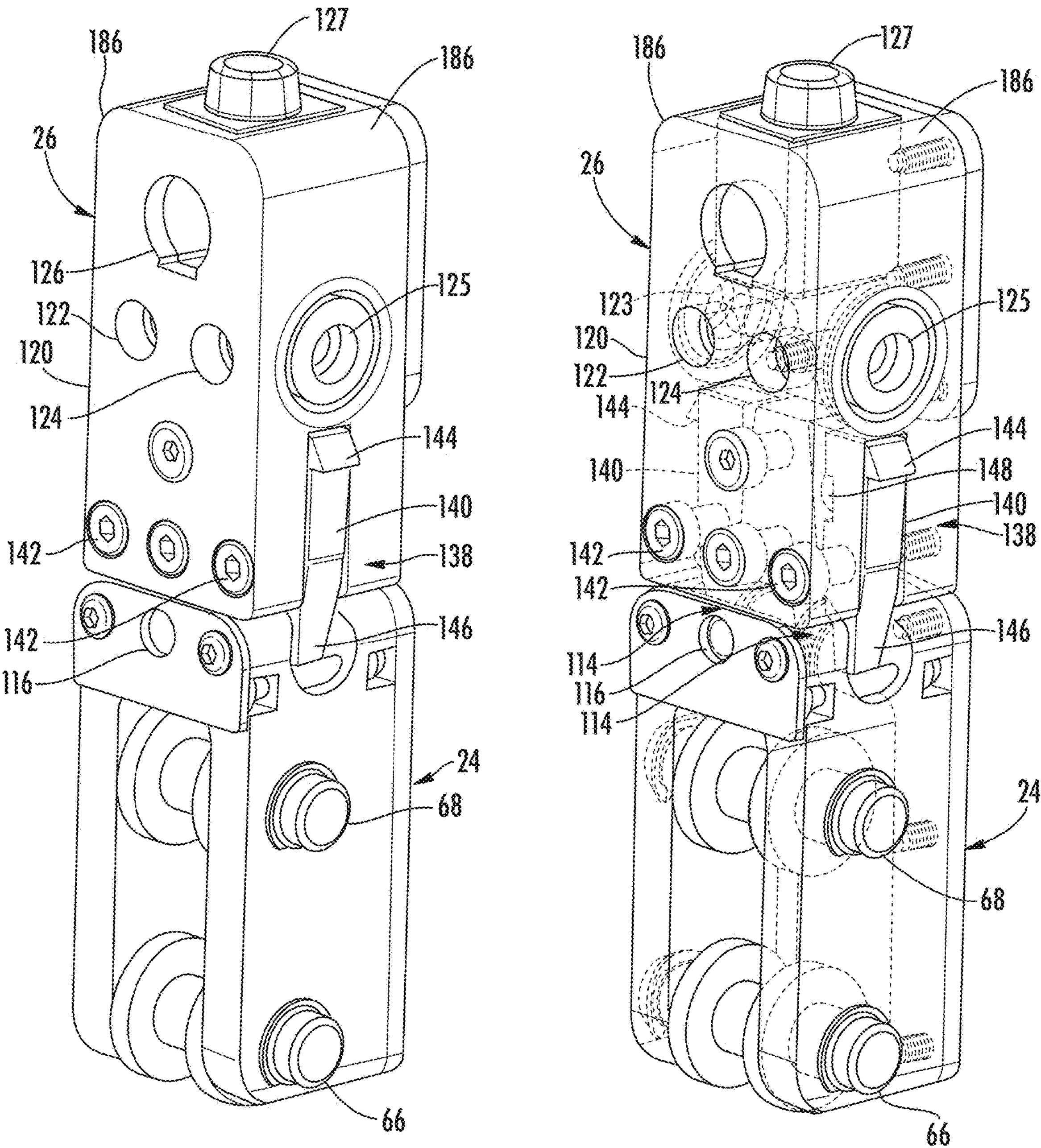
FIGS. 5A and 5B are front and rear perspective views of a carrier and a receiver of the automated trailer coupling arrangement.

As best illustrated in FIGS. 5A and 5B, the carrier 24 includes a pair of pneumatic cylinders 114 coupled to a pneumatic input 116, where the pneumatic input 116 is connected to a controller 118 (FIG. 1) remotely located from the carrier 24, and preferably located within a cab of the associated towing semi-truck.

The shuttle 26 (FIGS. 5A and 5B) includes a housing 20 that includes a first pneumatic input port 122 pneumatically coupled to a first pneumatic output port 123, a second pneumatic input port 124 pneumatically coupled to a second pneumatic output port 125, and an electrical input connector 126 electrically coupled to an electrical output connector 127. Preferably, the first pneumatic input port 122 and the second pneumatic input port 124 are plumbed to pneumatic supply lines 132, 134 (FIG. 1) coming from and supplied pneumatic pressure by the associated towing vehicle, and an electrical supply line 136 providing electricity from the associated towing vehicle. Alternatively, each of the pneumatic input ports 122, 124 and the electrical input connector 126 could be configured to operably couple to one or more glad hands typically associated with heavy-duty semi-truck/trailer connection arrangements.

The shuttle 26 further includes a coupling assembly 138 including a pair of clamping arms 140 pivotably coupled to the housing 120 via respective pivot bolts 142. Each clamping arm 140 includes a hook 144 positioned at a distal end thereof, and a proximal actuator end 146. Each clamping arm 140 is biased toward a clamping position by an associated coil spring 148 as described below. The shuttle 26 is prevented from moving along a length of the arm 48/50 when coupled to the carrier 24.

Figure 6:
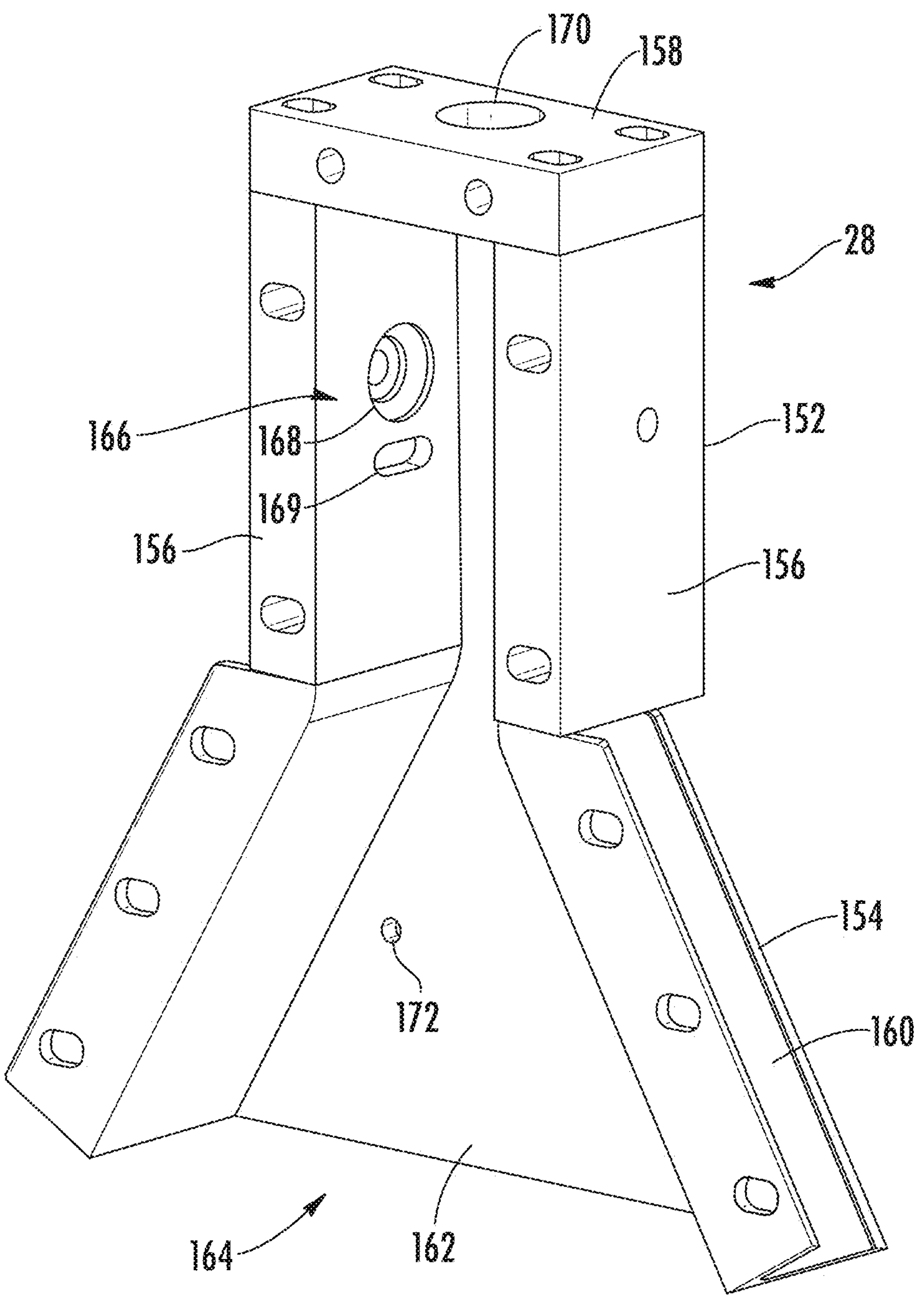
FIG. 6 is a perspective view of a receiver of the automated trailer coupling arrangement.
Figures 7A, 7B:
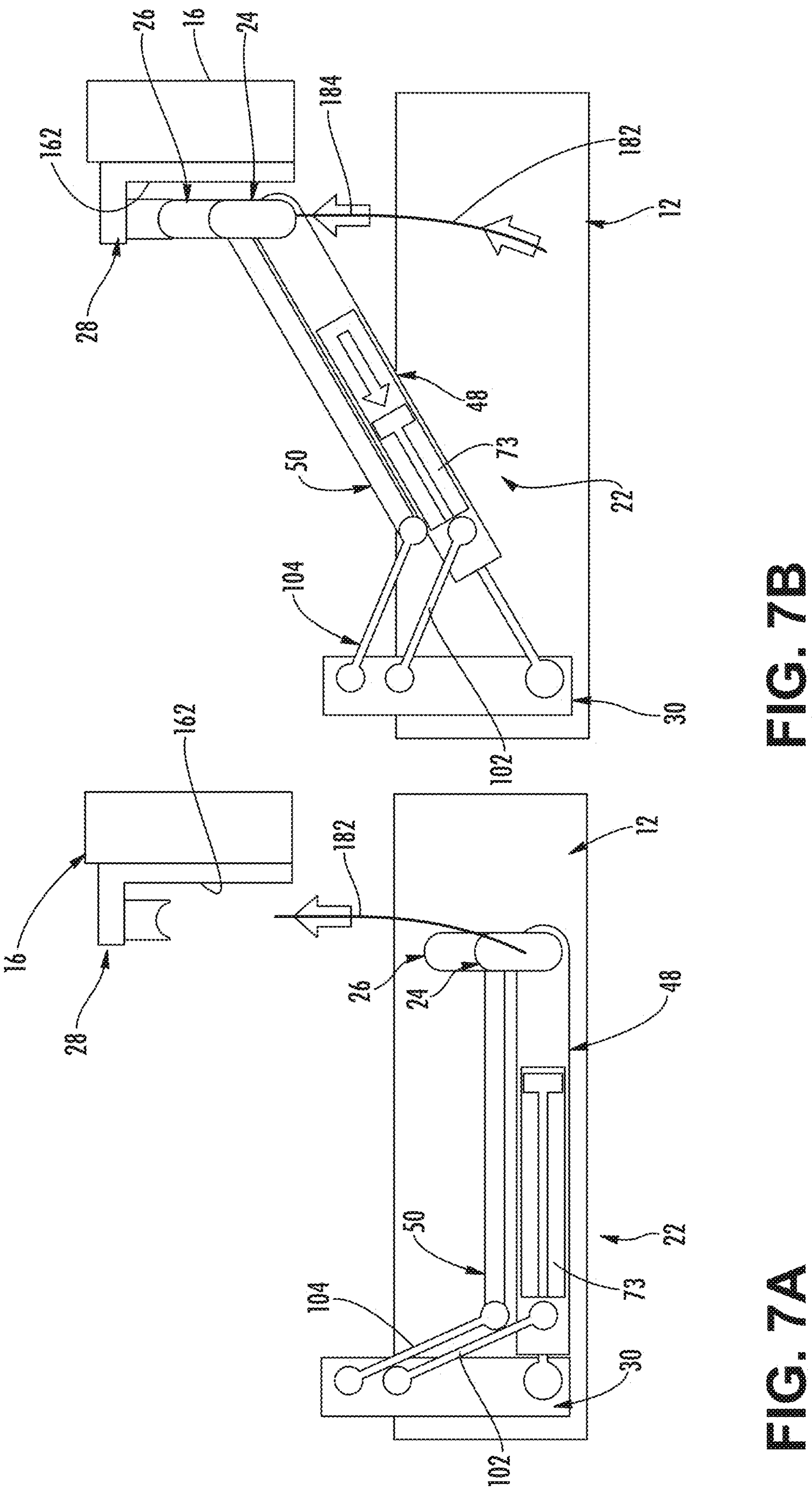
FIGS. 7A and 7B are schematic side views of the automated trailer coupling arrangement shown at various coupling stages.

In the illustrated example, the receiver 28 (FIG. 6) includes a C-shaped receiver portion 152, and a triangularly-shaped guide portion 154, where the receiver portion 152 includes a pair of side walls 156 and a top wall 158, and the guide portion 154 includes a pair of side walls 160 that flare laterally outward from the side walls 156 of the receiver portion 152. The receiver 158 further includes a rear wall 162 that cooperates with the sidewalls 156 of the receiver portion 150 and the sidewalls 160 of the guide portion 154 to define a widened lower portion 164 communicating with a narrowed upper portion 166. Each of the side walls 156 of the receiver portion 152 includes a pneumatic port 168 and a relief 169, while the top wall includes an electrical port 170 for receiving an electrical connection associated with the trailer therein. The rear wall 162 includes a plurality of apertures 172 configured to receive mechanical fasteners, such as screws or bolts, therethrough for attaching the receiver 28 to the front wall 16 of the trailer.

Figures 8A, 8B, 8C, 8D, 9:
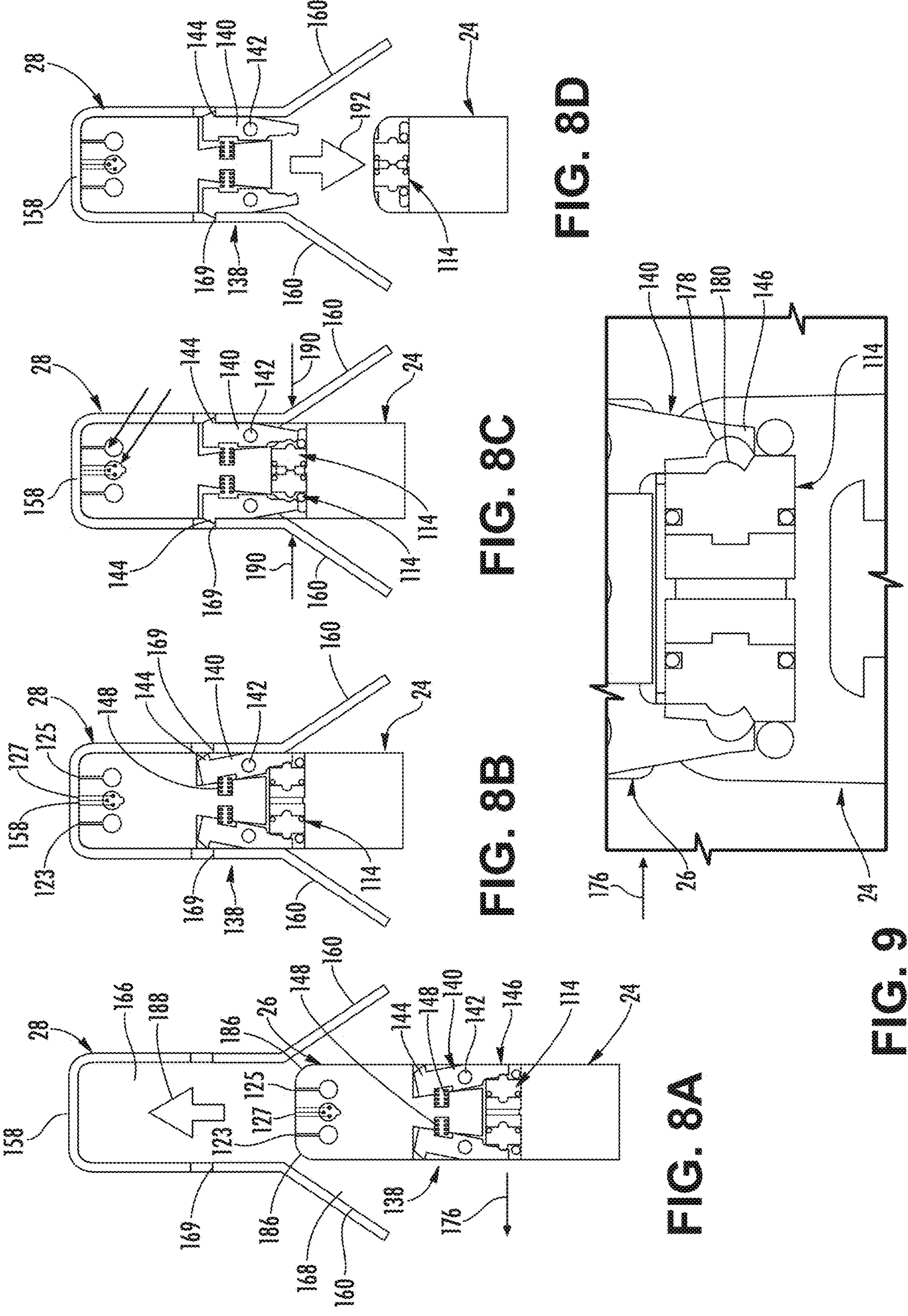
FIGS. 8A-8D are front elevational views of the automated trailer coupling arrangement illustrating a coupling procedure.
FIG. 9 is an enlarged cross-sectional view of a portion of the carrier, the shuttle and the receiver.
Figures 10A, 10B, 10C, 10D:
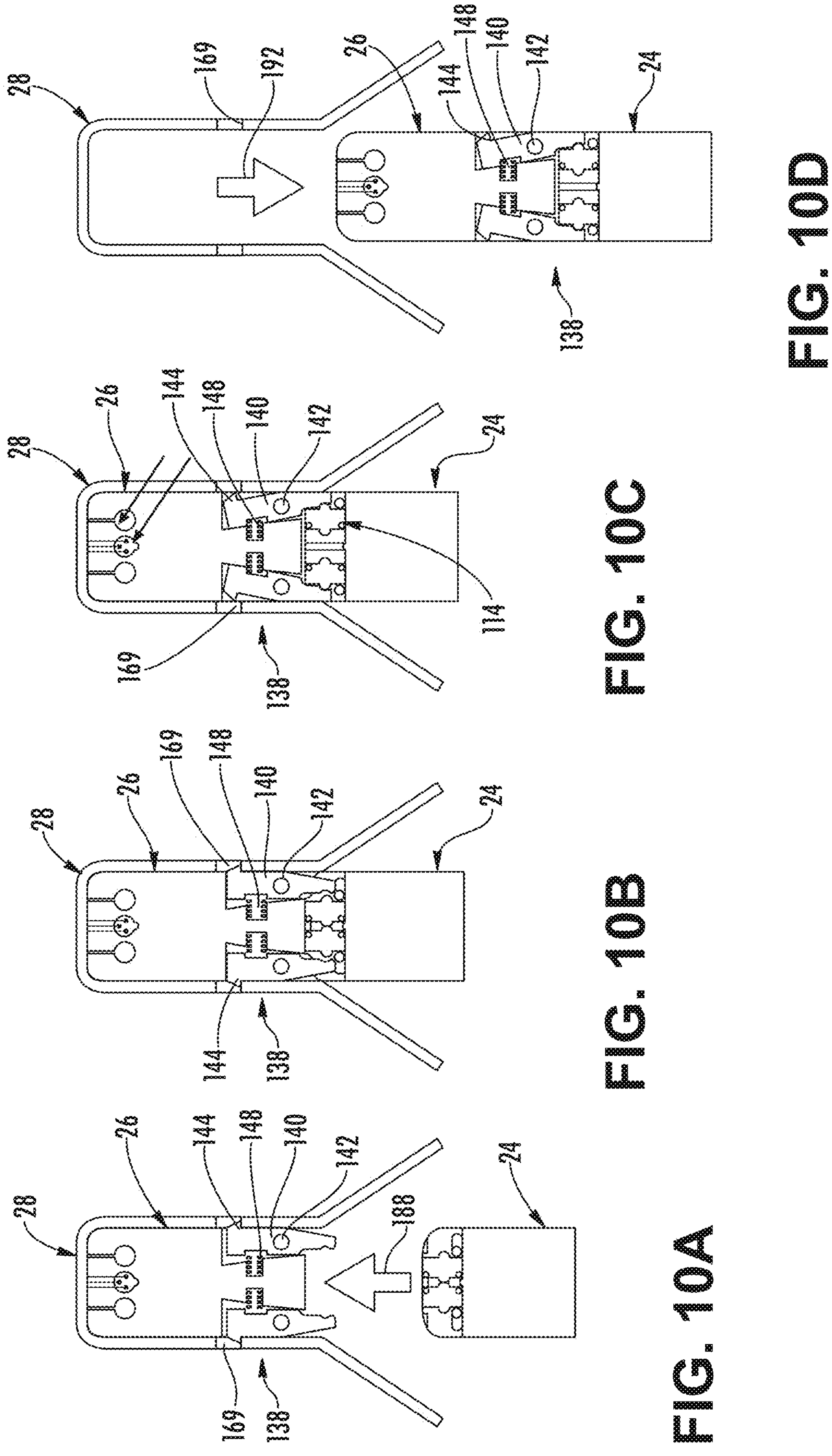
FIGS. 10A-10D are elevational front views of the automated a trailer coupling arrangement illustrating an uncoupling procedure.

During operation, the associated vehicle is coupled with the trailer or towed vehicle by positioning the tractor or towing vehicle with respect to the trailer such that the carrier 24 and the shuttle 26 as carried by the towing vehicle are somewhat aligned with the receiver 28 as carried by the towed vehicle. As best illustrated in FIGS. 7A, 7B and 8A-8D, the shuttle member 26 is initially carried by the carrier 24. Specifically, the pneumatic cylinders 114 of the carrier 24 are actuated via the controller 118 either by an operator or automatically by a vehicle control arrangement typically associated with automated vehicles, in an outward direction 176 such that the pneumatic cylinders 114 act against the distal end 146 of each of the clamping arms 140, thereby pivoting the clamping arms 140 about the associated pivot bolts 142 overcoming the biasing force exerted by the springs 140. As best illustrated in FIG. 9, the distal end 146 of each clamping arm 140 includes a relief 178 configured to receive a boss 180 of the associated pneumatic cylinder. The controller 118, whether manually or automatically operated, then actuates the pneumatic cylinder arrangement 173 of the cylinder assembly 48, thereby moving the carrier 24 and the shuttle 26 in an arcuate path 182. The carrier 24 and the shuttle 26 continue in the arcuate path 182 until the carrier 24 and/or the shuttle 26 abut the rear wall 162 of the receiver 28. The force exerted by the rear wall 162 on the carrier 24 and/or shuttle 26 may then force compression of the spring member 78 of the cylinder assembly 48 and the spring member 86 of the upper arm 58, such that the carrier 24 and the shuttle 26 then continue along a linear path 184. Further, should the carrier 24 and shuttle 26 be laterally misaligned with the upper portion 166 of the receiver 28, rounded upper corners 186 of the housing 120 of the shuttle 26 abut one of the angled sidewalls 160 thereby forcing the cylinder assembly 48 and the upper arm 50 to pivot about the pivot axis 42 and allowing proper alignment with and receiving of the shuttle 26 into the upper portion 166 of the receiver 28. The placer assembly 22 continues to move the carrier 24 and shuttle 26 in the upper direction 188 until the shuttle 26 is properly received within the upper portion 166 of the receiver 28, such that the pneumatic output ports 123, 125 are properly aligned with the pneumatic ports 168, and the electrical output connector 127 is properly aligned with the electrical port 170 of the receiver 28, thereby pneumatically and electrically coupling the towed vehicle with the towing vehicle. The controller then operates to move the pneumatic cylinders 114 in an inward direction 190 such that the springs 148 bias the hook 144 of each clamping arm 140 into engagement with one of the reliefs 169 of the side walls 156 of the carrier 24. The placer assembly 22 is then actuated in a downward direction 192 until the carrier 24 is free of the receiver 28, and returns the carrier 24 to a storage position during operation of the associated vehicle.

Uncoupling of the trailer from the towing vehicle is completed in a reversed but similar manner. As best illustrated in FIGS. 10A-10D, the placer assembly 22 moves the carrier 24 in the upper direction 188 until the carrier 24 is properly aligned with the shuttle 26. The pneumatic cylinders 114 are then actuated in the outward direction 176, thereby overcoming the biasing force exerted by the springs 148 on the clamping arms 140 and disengaging the hook 144 of each clamping arm 140 from the associated relief 169. The placer assembly 22 then is actuated in the downward direction 192, thereby removing the shuttle 26 from within the receiver 28.

Figures 11, 12:
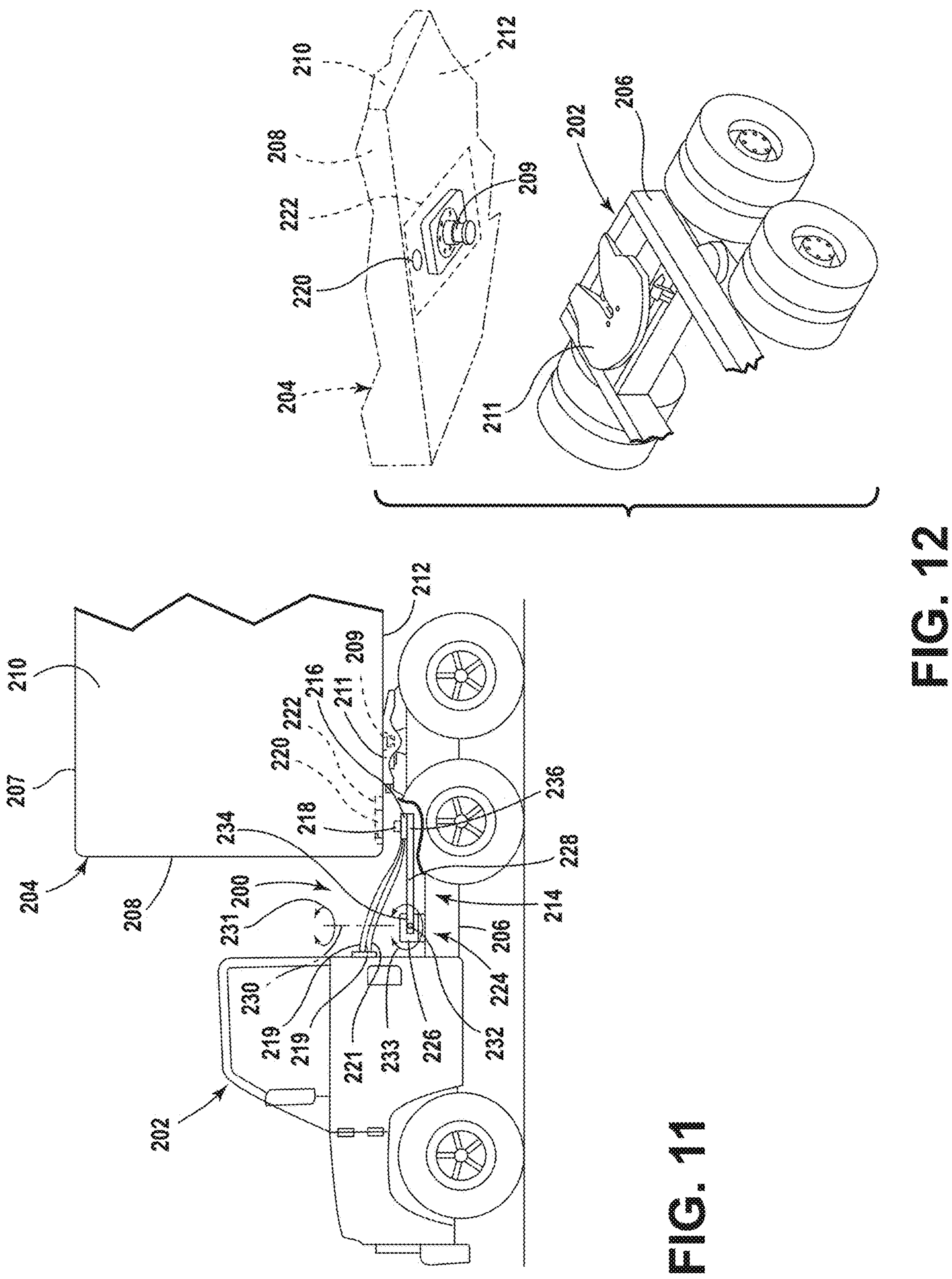
FIG. 11 is a side elevation view of another embodiment of the automated trailer coupling arrangement.
FIG. 12 is a perspective view of the coupling arrangement of FIG. 11.

The reference numeral 200 (FIG. 11) generally designates another embodiment of an automated coupling or connection arrangement for pneumatically and electrically coupling a towing vehicle 202 (FIGS. 11 and 12), or semi-truck to a towed vehicle 204, or semi-trailer. In the illustrated example, the towing vehicle includes a pair of longitudinally-extending, C-shaped frame rails 206 while the towed vehicle includes a cargo housing or container 207 having at least a front wall 208, a pair of side walls 210, and a bottom wall 212.

In the illustrated example, the coupling arrangement 200 includes an automated placer assembly or control arm assembly 214, a carrier 216 and a shuttle 218 configured to be manipulated and placed by the placer arrangement 214, and a downwardly opening receiver 220 fixedly secured within the bottom wall 212 of the cargo housing 207 of the trailer 204 and/or bolster plate 222 of the trailer 204 and configured to receive and couple with the shuttle 218. The receiver 220 is preferably located forwardly of the kingpin 209 of the trailer 204 and forward of the fifth wheel hitch plate 211 of the truck 202 when the kingpin 209 is received within and coupled to the fifth wheel hitch plate 211. Alternatively, the receiver 220 may be secured to an outer surface of the bottom wall 212. Similar to as discussed above with respect to the coupling arrangement 10, the shuttle 218 is pneumatically and electrically coupled to a pneumatic source and electric source of the truck 202 via pneumatic lines 219 and electrical line 221.

The placer assembly 214 includes a mounting assembly 224 including a mounting member 226 configured to be secured to one of the frame rails 206, and an arm 228, where the mounting member 226 and the arm 228 are configured such that the arm is pivotable about a vertical axis 230 for rotating movement in the directions 231 and a horizontal axis 232 that extends laterally with respect to a longitudinal axis of the truck 202, for rotating movement in the directions 233. The arm 228 may be fixed or variable in length. In the illustrated example, the arm 228 includes a first end 234 operably coupled to the mounting member for pivoting about the vertical axis 230 and horizontal axis 232, and a second end 236 operably coupled to the carrier 216. The arm 228 may be driven about the pivot axes 230, 232 either pneumatically, electrically, hydraulically or in any other suitable manner.

Figure 13A:
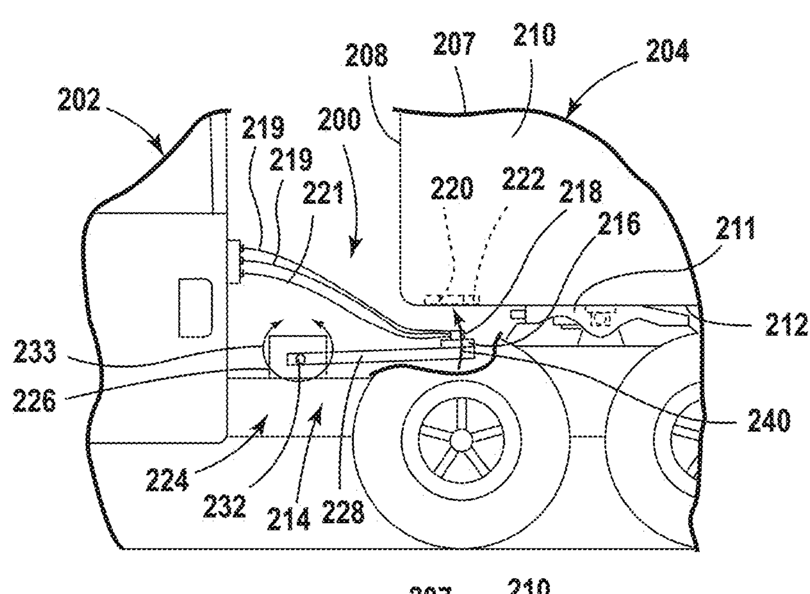
FIGS. 13A-13C are side elevation view of the coupling arrangement of FIG. 11 shown in an uncoupled position, an engaged position, and a coupled position, respectively.
Figure 13B:
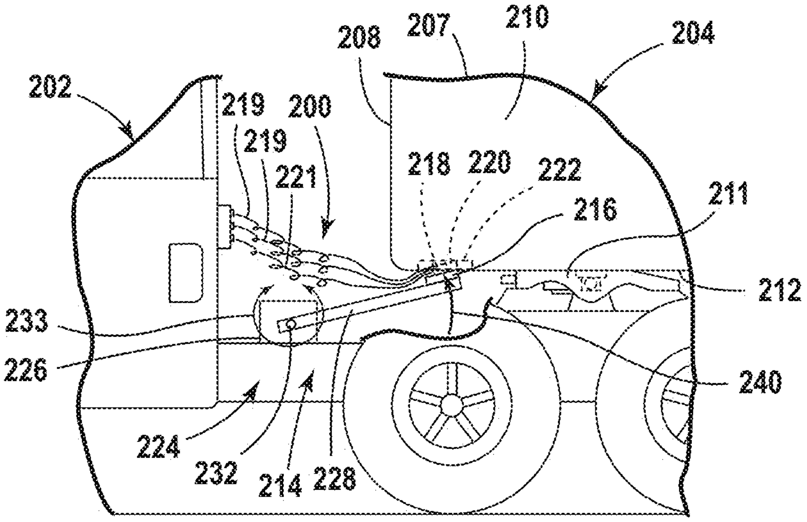
Figure 13C:
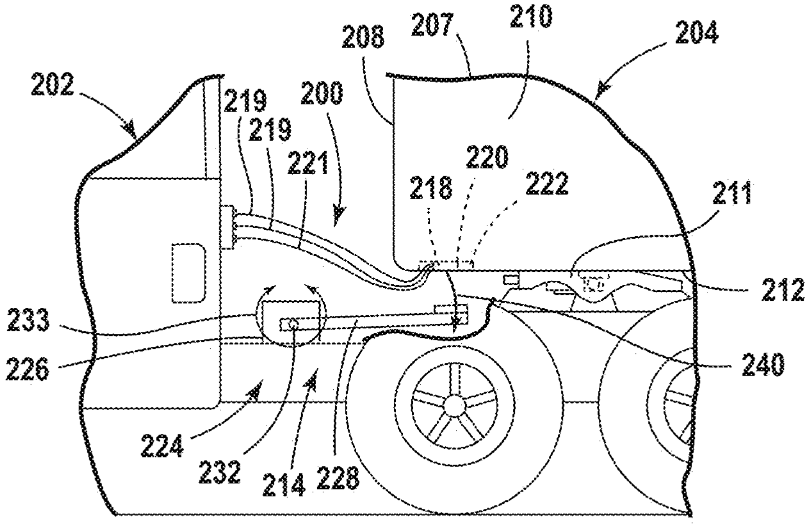

During operation, the towing vehicle 202 is coupled with the towed vehicle 204 by positioning the towing vehicle or truck 202 with respect to the towed vehicle trailer 204 such that the carrier 216 and the shuttle 218 as carried by the towing vehicle 202 are somewhat aligned with the receiver 220 as carried by the towed vehicle 204. As best illustrated in FIGS. 13A-13C, the shuttle member 218 is initially carried by the carrier 216. The arrangement releasably coupling the shuttle member 218 with the carrier member 216 may be similar to that as previously described with respect to the coupling arrangement 10, and may be operated via a local controller actuated an operator or automatically by a vehicle control arrangement typically associated with automated vehicles. The controller, whether manually or automatically operated, actuates the placer assembly 214 to move the carrier 216 and the shuttle 218 in an arcuate path 240 about the pivot axis 232 from the position as shown in FIG. 13A, until the shuttle is received within the receiver 220 to the position shown in FIG. 13B, and such that pneumatic output ports of the shuttle 218 are properly aligned with pneumatic ports of the receiver, and an electrical output connector of the shuttle 218 is properly aligned with an electrical port of the receiver 220, thereby pneumatically and electrically coupling the towed vehicle 204 with the towing vehicle 202. The controller then operates to uncouple the carrier 216 from the shuttle 218, such that the carrier 216 can move freely from the shuttle 218. The placer assembly 214 is then actuated to move the carrier 216 in a downward arcuate path 242 until the carrier 216 as shown in FIG. 13C is free of and no longer abuts the receiver 220, and returns the carrier 216 from the position shown in FIG. 13B to a storage position for operation of the associated vehicle.

Uncoupling of the trailer from the towing vehicle is completed in a reversed but similar manner, where the placer assembly 214 moves the carrier 216 in the upward arcuate path 240 from the position shown in FIG. 13C to the position shown in FIG. 13B and until the carrier 216 is properly aligned with the shuttle 218. The carrier 216 is then coupled with the shuttle 218, after which the placer assembly 214 moves the carrier 216 and the shuttle 218 in the downward arcuate path 242 from the position shown in FIG. 13B to the position shown in FIG. 13A.

Figure 14:
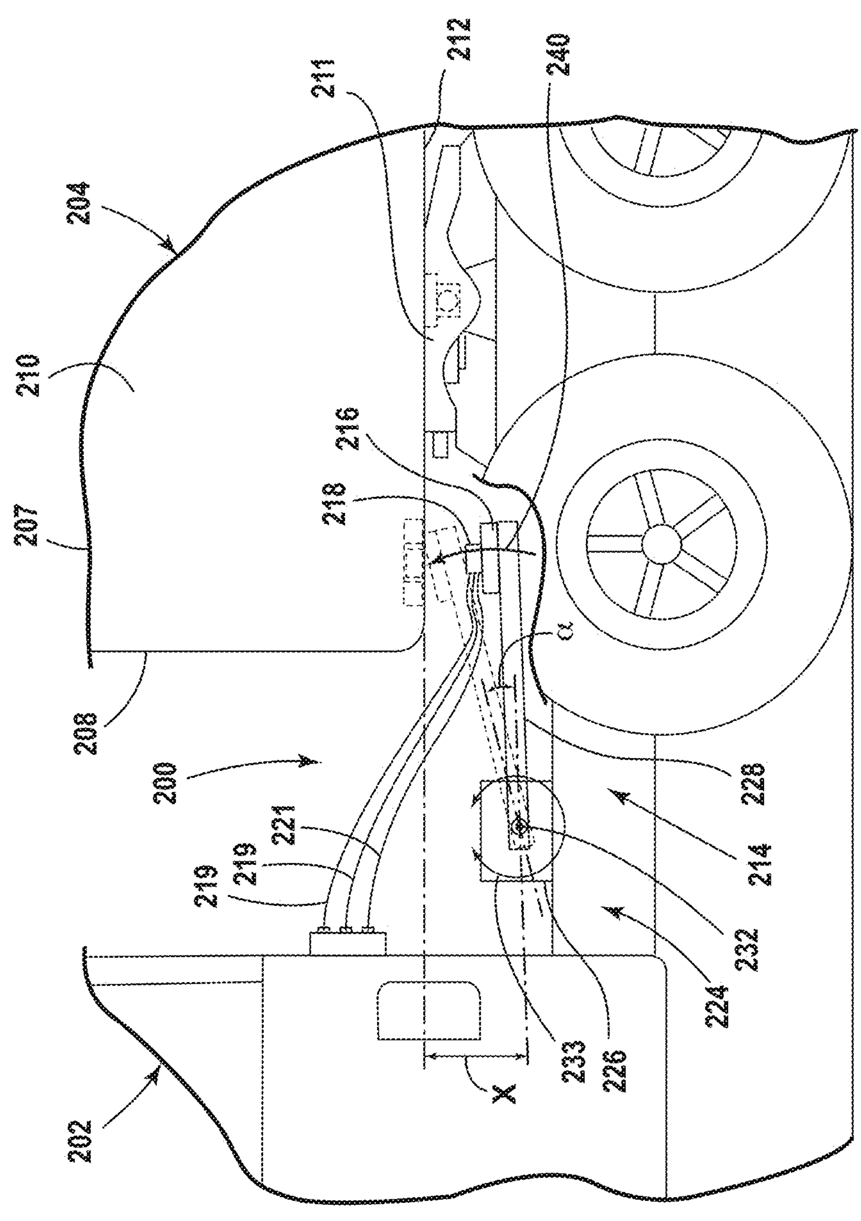
FIG. 14 is a side elevation view of the coupling arrangement of FIG. 11 shown in an uncoupled position in solid line and an engaged position in dashed line.

As best illustrated in FIG. 14, the arm 228 moves an angle $\alpha$ as the shuttle 218 moves along the path 240 and from the position shown in solid line, or as shown in FIG. 13A, and to the position shown in dashed line, or as shown in FIG. 13B. The pivot axis 232 is vertically offset from the receiver 220. Specifically, the pivot axis 232 is located at a first vertical height while the receiver 220 is located at a second vertical height, such that the difference between the first height and the second height is a distance X. It is noted that the greater the distance X and/or the angle $\alpha$, the more readily variations in the location of the receiver 220 along the longitudinal axis of the trailer 204 can be accounted for, therefore increasing the chances of proper alignment and proper coupling of the shuttle 218 with respect to the receiver 220 as the shuttle 218 is moved from the position shown in FIG. 13A to the position shown in FIG. 13B.

The above description is considered that of the preferred embodiments only. Modifications of the embodiments disclosed herein will occur to those skilled in the art and to those who make or use the disclosed embodiments. Therefore, it is understood that the embodiments shown in the drawings and described above are merely for illustrative purposes and not intended to limit the scope of the invention, which is defined by the following claims as interpreted according to the principles of patent law, including the doctrine of equivalents.

In the foregoing description, it will be readily appreciated by those skilled in the art that modifications may be made to the described embodiments without departing from the concepts disclosed herein. Such modifications are to be considered as included in the following claims unless these claims by their language expressly state otherwise.

The invention claimed is:

1. An automated trailer coupling arrangement, comprising:

a downwardly opening receiver member supported within a downwardly facing surface of a towed vehicle and including a first pneumatic coupler and an electrical coupler, wherein the receiver member is located at a first vertical height;

a shuttle member including a second pneumatic coupler configured to couple to a pneumatic supply source of a towing vehicle, and a second electrical coupler configured to couple to an electrical supply source of the towing vehicle; and a control arm assembly supported on the towing vehicle, comprising:

a carrier member configured to operably couple and uncouple with the shuttle member;

an arm having a first end operably coupled to the towing vehicle at a second vertical height that is less than the first vertical height, and a second end coupled to the carrier member and configured to move the carrier member between a first position where the carrier member is coupled with the shuttle member and the shuttle member is spaced from the receiver member, and a second position where the second pneumatic coupler is coupled with the first pneumatic coupler and the second electrical coupler is coupled with the first electrical coupler and the carrier member is uncoupled and spaced from the shuttle member;

wherein a distance between the first end and the second end of the arm is fixed as the arm moves between the first and second positions.

2. The automated trailer coupling arrangement of claim 1, wherein the shuttle member is coupled to the carrier member when in the first position such that the shuttle member is prevented from moving along a length of the arm.

3. The automated trailer coupling arrangement of claim 2, wherein the first end of the arm is pivotably coupled to the towing vehicle.

4. The automated trailer coupling arrangement of claim 3, wherein the first end of the arm is pivotably coupled to the towing vehicle for pivoting about a horizontal axis that extends perpendicular to a longitudinal axis of the towing vehicle.

5. The automated trailer coupling arrangement of claim 4, wherein the first end of the arm is pivotably coupled to the towing vehicle for pivoting about a vertical axis.

6. The automated trailer coupling arrangement of claim 4, wherein the control arm assembly includes a pneumatic actuator configured to move the arm between the first and second positions.

7. The automated trailer coupling arrangement of claim 6, further comprising:

a controller operably coupled to the arm and configured to move the arm between the first and second positions.

8. The automated trailer coupling arrangement of claim 7, wherein the receiver member is supported within a bolster plate of the towed vehicle.

9. The automated trailer coupling arrangement of claim 1, further comprising:

a controller operably coupled to the arm and configured to move the arm between the first and second positions.

10. An automated trailer coupling arrangement, comprising:

a downwardly opening receiver member supported within a downwardly facing surface of a towed vehicle and including a first pneumatic coupler and an electrical coupler, wherein the receiver member is located at a first vertical height;

a shuttle member including a second pneumatic coupler configured to couple to a pneumatic supply source of a towing vehicle, and a second electrical coupler configured to couple to an electrical supply source of the towing vehicle; and a control arm assembly supported on a towing vehicle, comprising:

a carrier member configured to operably couple and uncouple with the shuttle member;

an arm having a first end operably coupled to the towing vehicle at a second vertical height that is less than the first vertical height, and a second end coupled to the carrier member and configured to move the carrier member between a first position where the carrier member is coupled with the shuttle member and the shuttle member is spaced from the receiver member, and a second position where the second pneumatic coupler is coupled with the first pneumatic coupler and the second electrical coupler is coupled with the first electrical coupler and the carrier member is uncoupled and spaced from the shuttle member;

wherein the first end of the arm is pivotably coupled to the towing vehicle.

11. The automated trailer coupling arrangement of claim 10, wherein the first end of the arm is pivotably coupled to the towing vehicle for pivoting about a horizontal axis that extends perpendicular to a longitudinal axis of the towing vehicle.

12. An automated trailer coupling arrangement, comprising:

a downwardly opening receiver member supported within a downwardly facing surface of a towed vehicle and including a first pneumatic coupler and an electrical coupler, wherein the receiver member is located at a first vertical height;

a shuttle member including a second pneumatic coupler configured to couple to a pneumatic supply source of a towing vehicle, and a second electrical coupler configured to couple to an electrical supply source of the towing vehicle; and a control arm assembly supported on a towing vehicle, comprising:

a carrier member configured to operably couple and uncouple with the shuttle member;

an arm having a first end operably coupled to the towing vehicle at a second vertical height that is less than the first vertical height, and a second end coupled to the carrier member and configured to move the carrier member between a first position where the carrier member is coupled with the shuttle member and the shuttle member is spaced from the receiver member, and a second position where the second pneumatic coupler is coupled with the first pneumatic coupler and the second electrical coupler is coupled with the first electrical coupler and the carrier member is uncoupled and spaced from the shuttle member:

wherein the first end of the arm is pivotably coupled to the towing vehicle for pivoting about a vertical axis.

13. An automated trailer coupling arrangement comprising:

a downwardly opening receiver member supported within a downwardly facing surface of a towed vehicle and including a first pneumatic coupler and an electrical coupler, wherein the receiver member is located at a first vertical height:

a shuttle member including a second pneumatic coupler configured to couple to a pneumatic supply source of a towing vehicle, and a second electrical coupler configured to couple to an electrical supply source of the towing vehicle; and a control arm assembly supported on a towing vehicle, comprising:

a carrier member configured to operably couple and uncouple with the shuttle member;

an arm having a first end operably coupled to the towing vehicle at a second vertical height that is less than the first vertical height, and a second end coupled to the carrier member and configured to move the carrier member between a first position where the carrier member is coupled with the shuttle member and the shuttle member is spaced from the receiver member, and a second position where the second pneumatic coupler is coupled with the first pneumatic coupler and the second electrical coupler is coupled with the first electrical coupler and the carrier member is uncoupled and spaced from the shuttle member;

wherein the control arm assembly includes a pneumatic actuator configured to move the arm between the first and second positions.

14. An automated trailer coupling arrangement, comprising:

a downwardly opening receiver member configured to be supported on or within a downwardly facing surface of a towed vehicle and including a first pneumatic coupler and an electrical coupler, wherein the receiver member is located at a first vertical height;

a shuttle member including a second pneumatic coupler configured to couple to a pneumatic supply source of a towing vehicle, and a second electrical coupler configured to couple to an electrical supply source of the towing vehicle; and a control arm assembly configured to be supported on the towing vehicle, comprising:

a carrier member configured to operably couple and uncouple with the shuttle member;

an arm having a first end pivotably coupled to the towing vehicle at a second vertical height that is less than the first vertical height for pivoting about a horizontal axis perpendicular to a longitudinal axis of the towing vehicle and abut a vertical axis that is perpendicular to the longitudinal axis of the towing vehicle, and a second end pivotably coupled to the carrier member and configured to move the carrier member between a first position where the carrier member is coupled with the shuttle member and the shuttle member is spaced from the receiver member, and a second position where the second pneumatic coupler is coupled with the first pneumatic coupler and the second electrical coupler is coupled with the first electrical coupler and the carrier member is uncoupled and spaced from the shuttle member;

wherein a distance between the first end and the second end is fixed as the arm moves between the first and second positions; and wherein the shuttle member is coupled to the carrier member when in the first position such that the shuttle member is prevented from moving along a length of the arm.

15. The automated trailer coupling arrangement of claim 14, wherein the receiver member is configured to be received within a bolster plate of the towed vehicle.

16. A method for operating an automated trailer coupling arrangement, comprising:

providing a downwardly opening receiver member supported on or within a downwardly facing surface of a towed vehicle and including a first pneumatic coupler and an electrical coupler, wherein the receiver member is located at a first vertical height;

providing a shuttle member including a second pneumatic coupler pneumatically coupled to a pneumatic supply source of a towing vehicle, and a second electrical coupler coupled to an electrical supply source of the towing vehicle;

providing a control arm assembly coupled to the towing vehicle, comprising a carrier member configured to operably couple and uncouple with the shuttle member; and an arm having a first end operably coupled to the towing vehicle at a second height that is less than the first height, and a second end coupled to the carrier member; and coupling the shuttle member to the receiver member by moving the control arm assembly from a first position where the carrier member is coupled with the shuttle member and the shuttle member is spaced from the receiver member, to a second position where the shuttle member is received within the receiver member and is coupled to the carrier member, to a third position where the shuttle member is received within the receiver member and the first pneumatic coupler is pneumatically coupled with the second pneumatic coupler, respectively, and the first electrical coupler is coupled with the second electrical coupler, to a fourth position where the carrier member is uncoupled from the shuttle member and abuts the shuttle member, to a fifth position wherein the carrier member is uncoupled and spaced from the shuttle member, wherein a distance between the first and second ends of the arm remains constant as the control arm assembly moves between the first and second positions.

17. The method of claim 16, wherein the shuttle member is coupled to the carrier member when in the first position such that the shuttle member is prevented from moving along a length of the arm.

* * * * *